(12) United States Patent
Nakadai et al.

(10) Patent No.: US 8,073,690 B2
(45) Date of Patent: Dec. 6, 2011

(54) SPEECH RECOGNITION APPARATUS AND METHOD RECOGNIZING A SPEECH FROM SOUND SIGNALS COLLECTED FROM OUTSIDE

(75) Inventors: Kazuhiro Nakadai, Saitama (JP); Hiroshi Tsujino, Saitama (JP); Hiroshi Okuno, Kyoto (JP); Shunichi Yamamoto, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 972 days.

(21) Appl. No.: 11/792,052

(22) PCT Filed: Dec. 2, 2005

(86) PCT No.: PCT/JP2005/022601
§ 371 (c)(1),
(2), (4) Date: Feb. 8, 2008

(87) PCT Pub. No.: WO2006/059806
PCT Pub. Date: Jun. 8, 2006

(65) Prior Publication Data
US 2008/0167869 A1    Jul. 10, 2008

Related U.S. Application Data

(60) Provisional application No. 60/633,351, filed on Dec. 3, 2004.

(51) Int. Cl.
*G10L 15/20* (2006.01)
(52) U.S. Cl. ...................................... 704/233

(58) Field of Classification Search ............ 704/233
See application file for complete search history.

(56) References Cited

U.S. PATENT DOCUMENTS 6,967,455 B2 * 11/2005 Nakadai et al. .......... 318/568.12

OTHER PUBLICATIONS

Yamamoto et al., "Assessment of General Applicability of Robot Audition System by Recognizing three Simultaneous Speeches", Proceedings of 2004 IEEE/RSJ International Conference, Sep. 28-Oct. 2, 2004, pp. 2111-2116.
Yamamoto et al. "Evaluation of MFT-Based Interface between Sound Source Separation and ASR", vol. 22, Sep. 2004, a total of 5 pages.
Cooke, et al., "Robust automatic speech recognition with missing and unreliable acoustic data", Speech Communication 34 (2001), pp. 267-285.

(Continued)

*Primary Examiner* — Susan McFadden
(74) *Attorney, Agent, or Firm* — Squire, Sanders & Dempsey (US) LLP (57) ABSTRACT

A voice recognition system (10) for improving the toughness of voice recognition for a voice input for which a deteriorated feature amount cannot be completely identified. The system comprises at least two sound detecting means (16a, 16b) for detecting a sound signal, a sound source localizing unit (21) for determining the direction of a sound source based on the sound signal, a sound source separating unit (23) for separating a sound by the sound source from the sound signal based on the sound source direction, a mask producing unit (25) for producing a mask value according to the reliability of the separation results, a feature extracting unit (27) for extracting the feature amount of the sound signal, and a voice recognizing unit (29) for applying the mask to the feature amount to recognize a voice from the sound signal.

12 Claims, 8 Drawing Sheets

OTHER PUBLICATIONS

European Search Report application No. 05814282.9 dated Sep. 9, 2009.

Okuno, Hiroshi G., et al., "Effects of Increasing Modalities in Recognizing Three Simultaneous Speeches", Speech Communication 43, Sep. 1, 2004, pp. 347-359.

Nakadai, Kazuhiro, et al., "Improvement of Recognition of Simultaneous Speech Signals Using AV Integration and Scattering Theory for Humanoid Robots", Speech Communication 44, Oct. 1, 2004, pp. 97-112.

Yamamoto, Shun'ichi, et al., "Improvement of Robot Audition by Interfacing Sound Source Separation and Automatic Speech Recognition with Missing Feature Theory", International Conference on Robotics & Automation, Apr. 26, 2004, pp. 1517-1523.

McCowan, Iain et al., *"Improving Speech Recognition Performance of Small Microphone Arrays Using Missing Data Techniques"*, Dalle Molle Institute for Perceptual Artificial Intelligence (IDIAP), Sep. 16-20, 2002, pp. 2181-2184.

* cited by examiner

SPEECH RECOGNITION APPARATUS AND METHOD RECOGNIZING A SPEECH FROM SOUND SIGNALS COLLECTED FROM OUTSIDE

TECHNICAL FIELD

The present invention relates to a speech recognition apparatus and in particular it relates to a speech recognition apparatus that is robust to such speech that tends to deteriorate due to noises, input device specifications and so on.

BACKGROUND OF THE INVENTION

In general, a speech recognition apparatus in a real environment receives speech that deteriorates as it is mixed with noise and sound reverberations. The speech may also deteriorate depending on the specification of an input device. In order to cope with this problem, some approaches have been proposed for improving robustness of speech recognition by using such techniques as spectral subtraction, blind source separation and so on. One of such approaches proposed by M. Cooke et al. of Sheffield University is a missing feature theory ("Robust automatic speech recognition with missing and unreliable acoustic data", SPEECH COMMUNICATION 34, p. 267-285, 2001 by Martin Cooke et al.). This approach aims at improving robustness of speech recognition by identifying and masking missing features (that is, deteriorated features) contained in the features of an input speech. This approach is advantageous in that it requires less knowledge about noises in comparison with the other approaches.

In a missing feature theory, deteriorated features are identified based on difference from the features of non-deteriorated speech, based on local SN ratio of spectrum or based on an ASA (Auditory Scene Analysis). The ASA is a method of grouping components of the features by utilizing certain clue that is commonly included in sounds that are radiated from the same sound source. Such clue is, for example, harmonic structure of spectrum, synchronization of on-set, position of the source or the like. Speech recognition includes several methods such as a method of recognizing speech by estimating original features for a masked portion and a method of recognizing speech by generating a sound model corresponding to masked features.

SUMMARY OF THE INVENTION

In the missing feature theory, there is often a difficulty in identifying deteriorated features when improvement of robustness of speech recognition is intended. The present invention proposes a speech recognition apparatus for improving robustness of speech recognition for a speech input with which deteriorated features cannot be completely identified.

The present invention provides a speech recognition apparatus for recognizing speechs from sound signals that are collected from the outside. The apparatus has at least two sound detecting means for detecting the sound signals, a sound source localization unit for determining the direction of a sound source based on the sound signals, a sound source separation unit for separating the speeches from the sound signals according to the sound sources based on the direction of the sound sources, a mask generation unit for generating a value of a mask according to reliability of the result of separation, a feature extraction unit for extracting features of the sound signals, and a speech recognition unit for recognizing the speeches from the sound signals by applying the mask to the features.

According to the invention, robustness of speech recognition can be improved because the value of the mask is generated according to the reliability of the result of separation of the speech from the sound signal by sound source.

According to one aspect of the present invention, the mask generation unit generates the value of the mask according to the degree of correspondence between the result of separation of the sound signals obtained using a plurality of sound source separating techniques that are different from the technique used in the sound source separation unit and the result of the separation by the sound source separation unit.

According to another aspect of the present invention, the mask generation unit generates the value of the mask according to a pass-band for determining that the same sound source as defined by the direction of sound source.

According to a further aspect of the present invention, when there are multiple sound sources, the mask generation unit generates the value of the mask by increasing the reliability of separation result if (the signal is) closer to only one of the multiple sound sources.

REFERENCE CODES

10 Speech recognition apparatus
14 Sound source
16 Microphones
21 Sound source localization unit
23 Sound source separation unit
25 Mask generation unit
27 Feature extraction unit
29 Speech recognition unit

DESCRIPTION OF THE PREFERRED EMBODIMENTS

1. Outline

Figure 1:
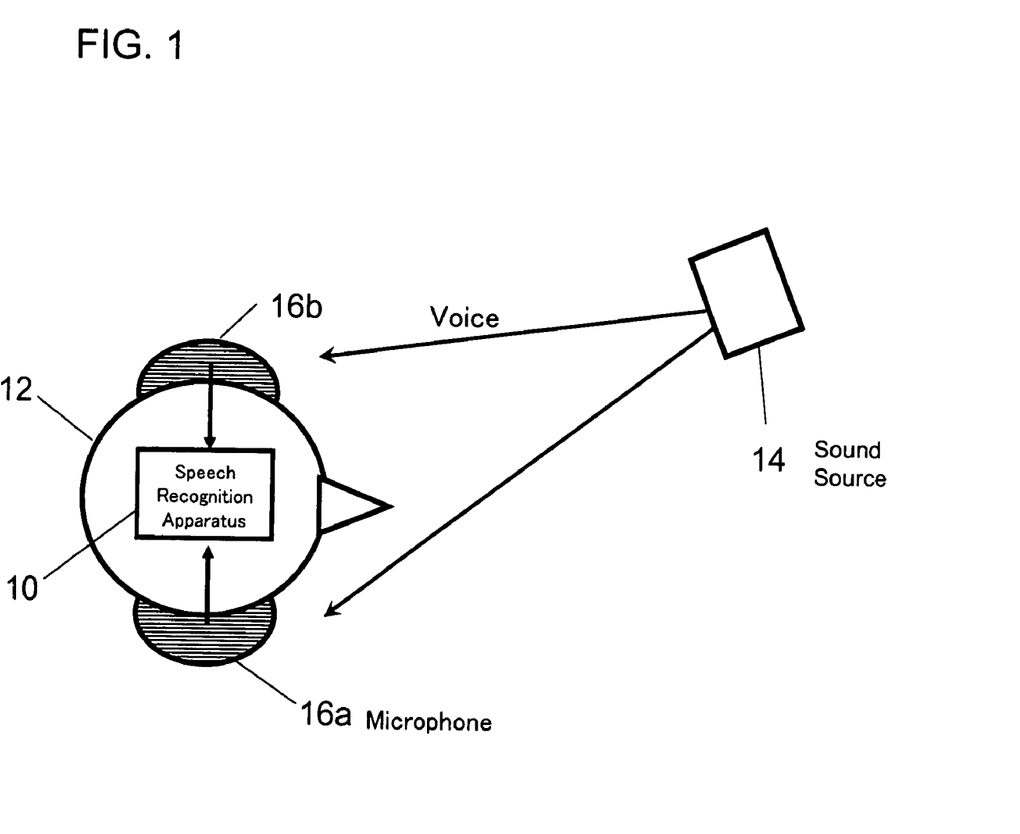
FIG. 1 is a general view of a speech recognition system including a speech recognition apparatus in accordance with one embodiment of the present invention.

Embodiments of the present invention will be described below with reference to the accompanying drawings. FIG. 1 is a general view of a speech recognition system including a speech recognition apparatus 10 in accordance with one embodiment of the present invention.

In this system, as shown in FIG. 1, a body 12 having the speech recognition apparatus 10 is provided to recognize speech coming from a sound source 14 that is located in its circumference. The sound source 14 is, for example, a human being or a robot, which produces speech for communication. The body 12 is, for example, a mobile robot or an electrical equipment, which uses speech recognition for an interface.

On both sides of the body 12, there are disposed a pair of microphones 16a, 16b for collecting speech from the sound source. It should be noted that the position of the microphones 16a, 16b is not limited to both sides of the body 12 but they may be disposed at any other position relative to the body 12. Besides, the number of the microphones is not limited to two but any other number of the microphones more than two may be used.

In this system, the speech coming from the sound source 14 is collected by the microphones 16. The collected speech is processed by the speech recognition apparatus 10 located in the body 12. The speech recognition apparatus determines the direction of the sound source 14 in order to recognize content of the speech. The body 12 may, for example, perform a task indicated by the content of the speech or may reply with an embedded speaking mechanism.

Figure 2:
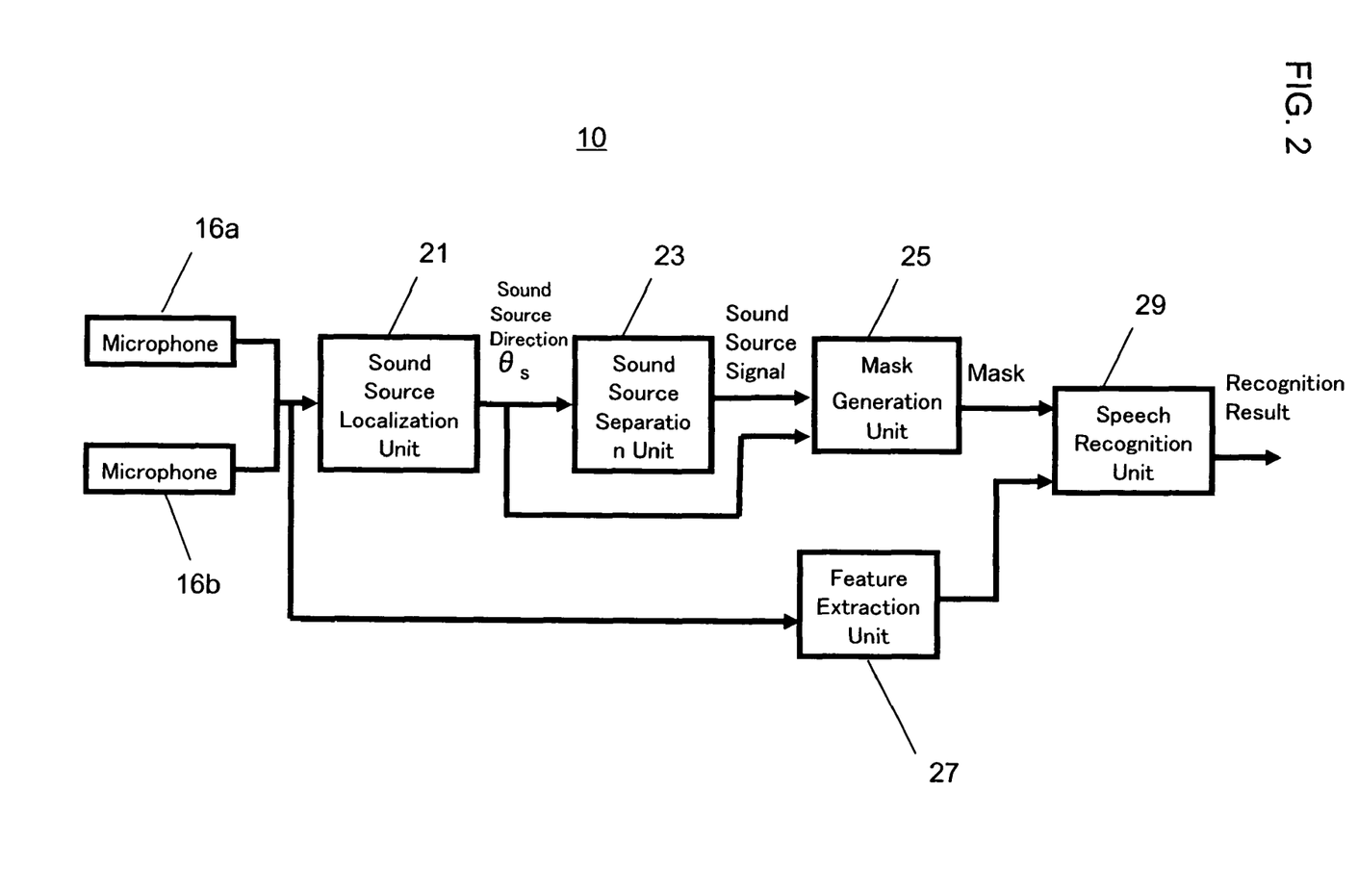
FIG. 2 is a block diagram of a speech recognition apparatus in accordance with one embodiment of the present invention.

Now, details of the speech recognition apparatus 10 will be described. FIG. 2 is a block diagram of the speech recognition apparatus 10 in accordance with one embodiment of the present invention.

A plurality of microphones 16a, 16b collect speech coming from a single or multiple sound sources 14 and deliver the speech containing sound signals to the speech recognition apparatus 10.

A sound source localization unit 21 determines the direction $\theta_s$ of the sound source 14 based on the sound signals that are received with the microphones 16a, 16b. When the sound source 14 and/or the apparatus itself 10 moves, localization of the sound source 14 is traced with time. In this embodiment, localization of the sound source is performed by using a method of epipolar geometry, scattering theory or transfer function. A sound source separation unit 23 uses the direction information $\theta_s$ of the sound source 14 that is obtained in the sound source localization unit 21 to separate a sound source signal from the input signal. In this embodiment, the sound source separation is performed by combining an inter-microphone phase difference $\Delta\phi$ or an inter-microphone sound intensity difference $\Delta\rho$ (which is obtained using the above described epipolar geometry, scattering theory or transfer function) with a pass-band function that imitates human auditory characteristics.

A mask generation unit 25 generates a value of a mask depending on whether the result of the separation by the sound source separation unit 23 is reliable or not. Spectrum of the input signal and/or the result of the sound source separation is used for evaluating the reliability of the separation result. The mask takes a value of 0 to 1. When the value is closer to 1, the reliability is higher. Each of the values of the masks that are generated in the mask generation unit is applied to the features of the input signal to be used in the speech recognition.

A feature extraction unit 27 extracts the features from the spectrum of the input signal.

A speech recognition unit 29 determines output probability of the features from a sound model to recognize the speech. At this time, the mask generated in the mask generation unit 25 is applied in order to adjust the output probability. In this embodiment, the speech recognition is performed using the Hidden Markov Model (HMM).

Processes performed in each unit of the speech recognition apparatus 10 will be described below.

2. Sound Source Localization Unit

The sound source localization unit 21 determines the direction of sound source 14 based on the sound signals that are received by the microphones 16a, 16b. In addition, when the sound source 14 and/or the apparatus itself 10 moves, the identified position of the sound source 14 is traced in time. In this embodiment, localization of the sound source is performed by using a method selected from a plurality of methods including a scheme using an epipolar geometry of the source 14 and the microphones 16 (refer to section 2.1.), a scattering theory (refer to section 2.2.) and a transfer function (refer to section 2.3.). It should be noted that the source localization may be performed using any other known method such as a beam forming method or the like.

Figure 3:
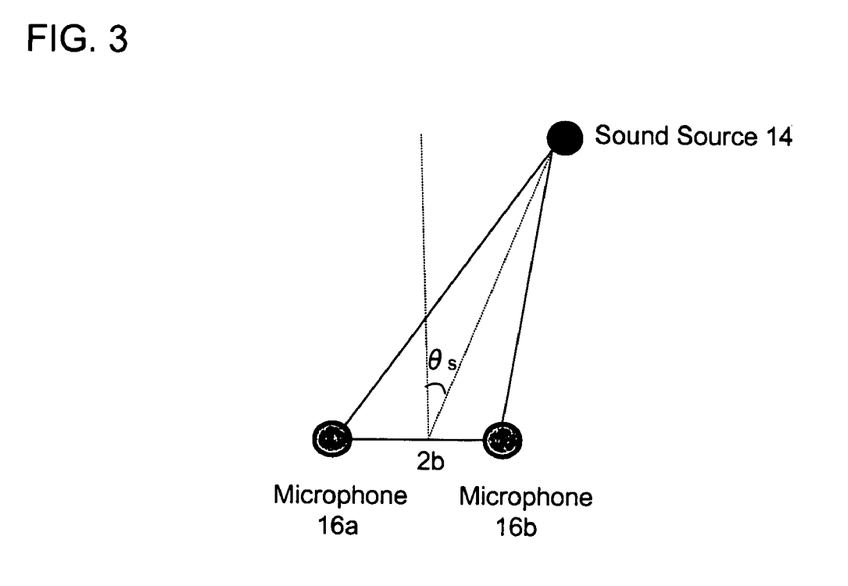
FIG. 3 shows microphones and an epipolar geometry.

2.1. Source Localization Using Epipolar Geometry of Sound Source and Microphones This method uses the epipolar geometry of the microphones 16 and the sound source 14, as shown in FIG. 3, in order to calculate the source direction θs. As shown in FIG. 3, the distance between the microphones 16a and 16b is represented by 2b. A middle point between both microphones is made an origin and a vertical direction from the origin is assumed to be the front.

Details of the epipolar geometry can be seen in an article "Position localization/separation/recognition of multiple sound sources by active audition" by Nakadai et al., AI Challenge Study Team, pp. 1043-1049, Association of Artificial Intelligence, 2002.

The sound source localization using the epipolar geometry is performed according to the following procedure:

1) The FFT or the like is used to perform a frequency analysis on the sound signal that is received from the microphones 16a, 16b to obtain spectra S1(f), S2(f).

2) The obtained spectra are divided into multiple frequency sub-bands and a phase difference $\Delta\phi(f_i)$ of each sub-band $f_i$ is obtained in accordance with Equation (1).

$$\Delta\varphi(f_i) = \arctan\left(\frac{\mathrm{Im}[S1(f_i)]}{\mathrm{Re}[S1(f_i)]}\right) - \arctan\left(\frac{\mathrm{Im}[S2(f_i)]}{\mathrm{Re}[S2(f_i)]}\right) \quad (1)$$

where $\Delta\phi(f_i)$ indicates an inter-microphone phase difference of $f_i$. $\mathrm{Im}[S1(f_i)]$ indicates an imaginary part of the spectrum $S1(f_i)$ in the sub-band $f_i$ of the microphone 1. $\mathrm{Re}[S1(f_i)]$ indicates a real part of the spectrum $S1(f_i)$ in the sub-band $f_i$ of the microphone 1. $\mathrm{Im}[S2(f_i)]$ indicates an imaginary part of the spectrum $S2(f_i)$ in the sub-band $f_i$ of the microphone 2. $\mathrm{Re}[S2(f_i)]$ indicates a real part of the spectrum $S2(f_i)$ in the sub-band $f_i$ of the microphone 2.

3) The epipolar geometry (FIG. 3) is used to derive Equation (2).

$$\Delta\varphi(\theta, f_i) = \frac{2\pi f_i}{v} \times b(\theta + \sin\theta) \quad (2)$$

where v indicates the sound speed, b indicates a distance between the origin and the microphone and θ indicates an angle of the sound source direction.

Figure 4:
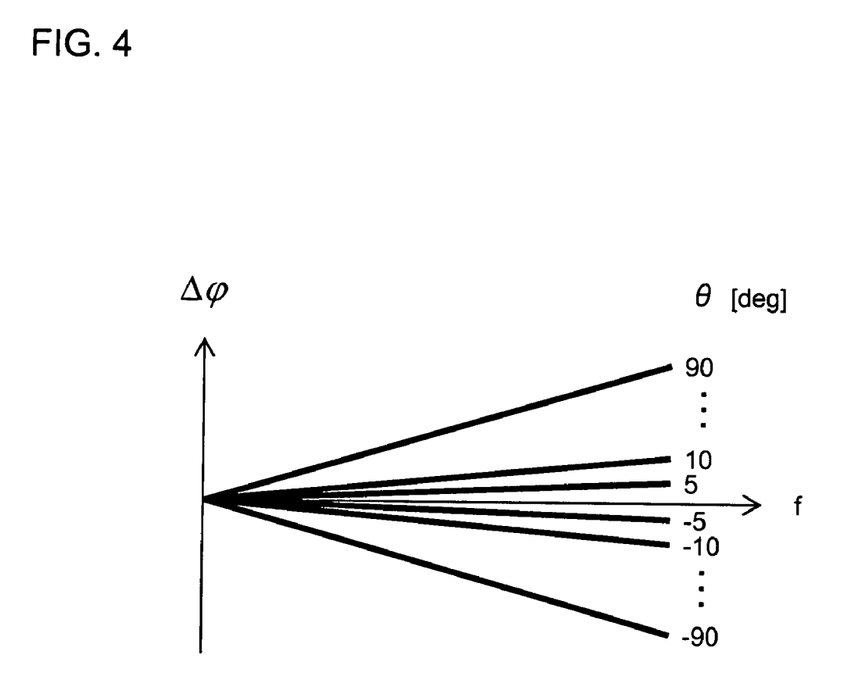
FIG. 4 is a graph showing a relation among an inter-microphone phase difference $\Delta\phi$ derived from an epipolar geometry, a frequency f and a sound source direction $\theta_s$.

By assigning to θ in Equation (2) a value, for example, for every 5 degrees in a range from −90 degrees to +90 degrees to obtain a relation between the frequency $f_i$ and the phase difference Δφ as shown in FIG. 4. By using the relation as shown in FIG. 4, the angle θ of Δφ (θ, $f_i$) that is closest to Δφ($f_i$) is determined. This angle θ is the sound source direction $\theta_i$ of the sub-band $f_i$.

4) From the sound source direction $\theta_i$ and the frequency for each sub-band, the sub-bands whose source directions are close to each other and which are in an articulation relation to each other are selected and grouped. The sound source direction of such group is taken as $\theta_s$. When a plurality of groups are selected, there is a possibility that multiple sound sources exist. In this case, the sound source direction for each group may be determined. When the number of the sound sources is known in advance, it is desirable that the number of the groups corresponding to the number of the sound sources be selected.

2. 2. Localization of the Sound Source Using the Scattering Theory

This method calculates a sound source direction $\theta_s$ in consideration of scattered waves by the body 12 having the microphone 16. In this example, the body 12 having the microphone 16 is assumed to be a head of a robot, which forms a sphere having a radius b. Besides, the center of the head is regarded as an origin of a polar coordinate (r, θ, φ).

Details of the scattering theory can be seen, for example, in an article "Scattering Theory" by Lax et al., Academic Press, NY., 1989.

The sound source localization by using the scattering theory is performed according to the following procedure:

1) The FFT or the like is used to perform a frequency analysis upon the sound signal that is input from the microphones 16a, 16b to determine spectra S1(f), S2(f).

2) The determined spectra are divided into multiple frequency sub-bands and a phase difference Δφ($f_i$) of each sub-band $f_i$ is obtained in accordance with Equation (1). Or, a sound intensity difference Δρ($f_i$) of each sub-band $f_i$ is obtained according to Equation (3).

$$\Delta\rho(f_i) = 20 \log_{10} \frac{|P1(f_i)|}{|P2(f_i)|} \quad (3)$$

where Δρ($f_i$) indicates a sound intensity difference between the two microphones. P1($f_i$) indicates a power of the sub-band $f_i$ of the microphone 1 and P2($f_i$) indicates a power of the sub-band $f_i$ of the microphone 2.

3) Assuming that the position of the sound source 14 is $r_0=(r_0, 0, 0)$, the position of the observation point (the microphone 16) is r=(b, 0, 0) and the distance between the sound source and the observation point is R=|$r_0$-r|, a potential $V^i$ by the direct sound at the head portion of the robot is defined as in Equation (4).

$$V^i = \frac{v}{2\pi R f} e^{i\frac{2\pi R f}{v}} \quad (4)$$

where f indicates the frequency, v indicates the sound speed and R indicates the distance between the sound source and the observation point.

4) A potential S(θ, f) by the direct sound from the sound source direction θ and the scattered sounds at the head portion of the robot is defined as in Equation (5).

$$S(\theta, f) = V^i + V^s = -\left(\frac{v}{2\pi b f}\right)^2 \sum_{n=0}^{\infty} (2n+1) P_n(\cos\theta) \frac{h_n^{(1)}\left(\frac{2\pi r_0}{v} f\right)}{h_n^{(1)\prime}\left(\frac{2\pi b}{v} f\right)} \quad (5)$$

where $V^s$ indicates the potential by the scattered sounds, $P_n$ indicates the Legendre function of the first order and $h_n$(1) indicates the spherical Hankel function of the first order.

5) Assuming that the polar coordinate of the microphone 16a is represented by (b, π/2, 0) and the polar coordinate of the microphone 16b is represented by (b, −π/2, 0), potentials of each microphone are represented by Equation (6) and Equation (7).

$$S1(\theta, f) = S(\pi/2 - \theta, f) \quad (6)$$

$$S2(\theta, f) = S(-\pi/2 - \theta, f) \quad (7)$$

6) The phase difference Δφ(θ, $f_i$) and the sound intensity difference Δρ(θ, $f_i$) in each sub-band $f_i$ are related with the direction θ of the sound source by Equation 8 and Equation (9) respectively.

$$\Delta\phi(\theta, f_i) = arg(S1(\theta, f_i)) - arg(S2(\theta, f_i)) \quad (8)$$

$$\Delta\rho(\theta, f_i) = 20 \log_{10} \frac{|S1(\theta, f_i)|}{|S2(\theta, f_i)|} \quad (9)$$

7) Appropriate values (for every five degrees for example) are assigned to θ in Equation (8) and Equation (9) in advance, so that a relation between the frequency $f_i$ and the phase difference Δφ(θ, $f_i$) or a relation between the frequency $f_i$ and the sound intensity difference Δρ(θ, $f_i$) are obtained.

8) Among Δφ(θ, $f_i$) or Δρ(θ, $f_i$), θ that is the closest to Δφ($f_i$) or Δρ($f_i$) is taken as the sound source direction $\theta_i$ of each sub-band $f_i$.

9) From the sound source direction $\theta_i$ and the frequency for each sub-band, the sub-bands whose source directions are close each other and which are in an articulation relation each other are selected and grouped. The sound source direction of such group is assumed as $\theta_s$. When a plurality of groups are selected, there is a possibility that multiple sound sources may exist. In this case, the sound source direction for each group may be obtained. When the number of the sound sources is known in advance, it is desirable that the number of the groups corresponding to the number of the sound sources be selected. Besides, the sound source direction $\theta_s$ may be obtained by using both of Δφ($f_i$) and Δρ($f_i$).

2. 3. Sound Source Localization Using Transfer Function

Measuring a transfer function is a general method for associating phase difference and/or sound intensity difference with frequency and sound source direction. The transfer function is generated through measurement of impulse responses from various directions using the microphones 16a, 16b installed in the body 12 (which is, for example, a robot). This transfer function is used to identify the sound source direction. The sound source localization using the transfer function is performed according to the following procedure:

1) The FFT or the like is used to perform a frequency analysis upon the sound signal that is input from the microphones 16*a*, 16*b* to determine spectra $S1(f)$, $S2(f)$.

2) The determined spectra are divided into multiple frequency sub-bands and a phase difference $\Delta\phi(f_i)$ of each sub-band $f_i$ is obtained in accordance with Equation (1). Or, a sound intensity difference $\Delta\rho(f_i)$ of each sub-band $f_i$ is obtained according to Equation (3).

3) Impulse responses are measured in an appropriate interval (for example, for every five degrees) in a range of ±90 degrees to obtain a transfer function. Specifically, an impulse response for each direction θ is measured by the microphones 16*a*, 16*b* and a frequency analysis using the FFT or the like is performed on the measured impulse response, so that spectra (transfer functions) $Sp1(f)$, $Sp2(f)$ of each frequency f corresponding to the impulse response are obtained. By using the following Equation (10) and Equation (11), a phase difference $\Delta\phi(\theta, f)$ and a sound intensity difference $\Delta\rho(\theta, f)$ are obtained from the transfer functions $Sp1(f)$, $Sp2(f)$.

$$\Delta\phi(\theta,f)=arg(Sp1(f))-arg(Sp2(f)) \qquad (10)$$

$$\Delta\rho(\theta, f) = 20\log_{10}\frac{|Sp1(f)|}{|Sp2(f)|} \qquad (11)$$

Calculations using Equation (10) and Equation (11) are performed in association with the direction θ in an arbitrary interval and the arbitrary frequency f in a range of ±90 degrees. Examples of the calculated phase difference $\Delta\phi(\theta, f)$ and sound intensity difference $\Delta\rho(\theta, f)$ are shown in FIG. 5 and FIG. 6.

Figure 5:
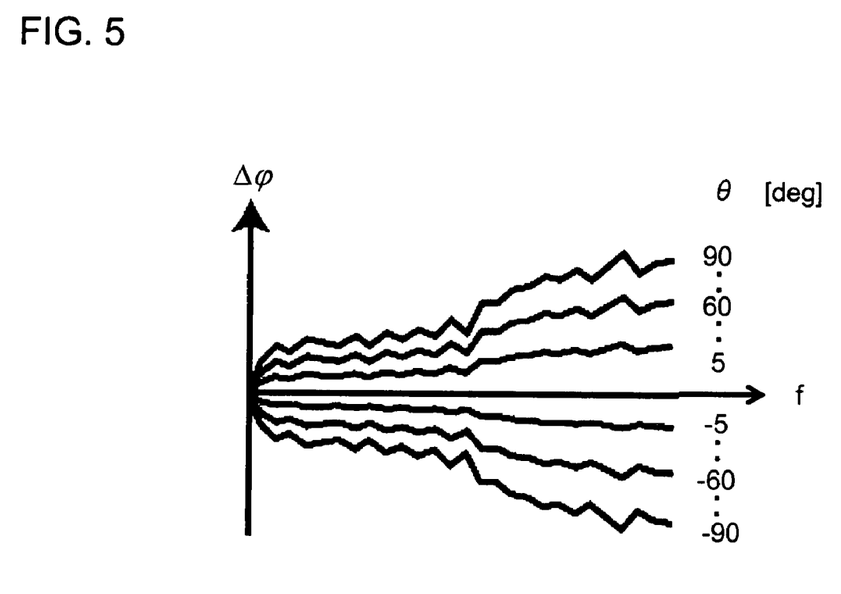
FIG. 5 is a graph showing a relation among an inter-microphone phase difference $\Delta\phi$ derived from a transfer function, a frequency f and a sound source direction $\theta_s$.
Figure 6:
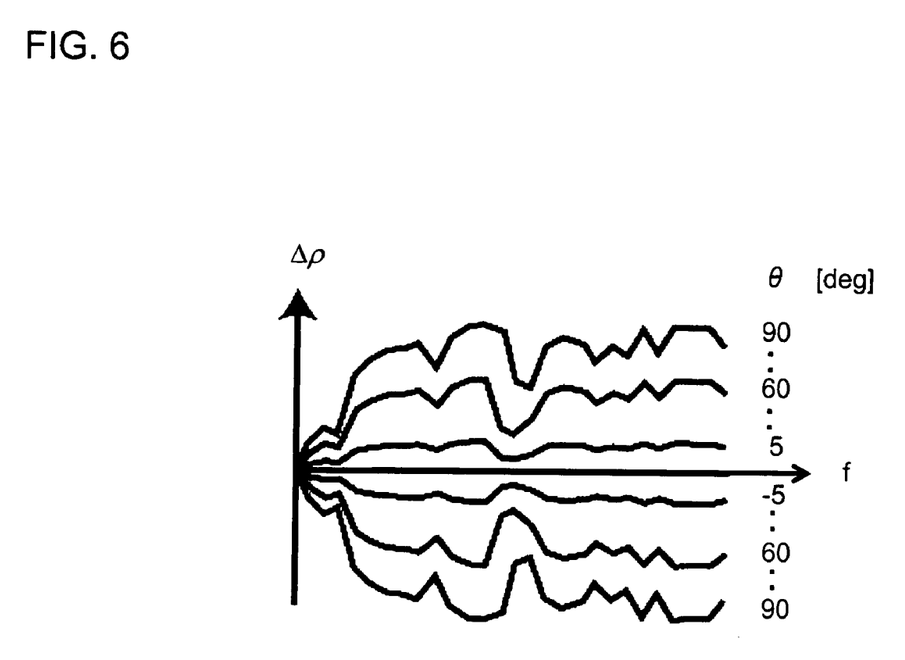
FIG. 6 is a graph showing a relation among an inter-microphone sound intensity difference $\Delta\rho$ derived from a transfer function, a frequency f and a sound source direction $\theta$.

4) By using the relation as shown in FIG. 5 or FIG. 6, the angle θ that is closest to $\Delta\phi(f_i)$ or $\Delta\rho(f_i)$ is determined. This θ is the sound source direction $\theta_i$ of each sub-band $f_i$.

5) From the sound source direction $\theta_i$ and the frequency for each sub-band, the sub-bands whose source directions are close to each other and which are in an articulation relation to each other are selected and grouped. The sound source direction of such group is assumed as $\theta_s$. When a plurality of groups are selected, there is a possibility that multiple sound sources exist. In this case, the sound source direction for each group may be determined. Besides, the sound source direction $\theta_s$ may be determined using both of $\Delta\phi(f_i)$ and $\Delta\rho(f_i)$.

2. 4. Sound Source Localization Using a Cross-Correlation of Input Signals of Microphones This method determined a difference (d in FIG. 7) in distances from the sound source 14 to the microphone 16*a* and the microphone 16*b* based on a correlation of the input signals of the microphones 16*a* and 16*b* and estimates the sound source direction $\theta_s$ from a relation between the obtained distance d and the inter-microphone distance $2b$. This method is performed according to the following procedure:

1) A cross-correlation CC(T) of the input signals to the microphone 16*a* and the microphone 16*b* is calculated by using Equation (12).

$$CC(T) = \int_0^T x_1(t)x_2(t+T)dt \qquad (12)$$

where T indicates a frame length. $x_1(t)$ indicates an input signal that is extracted in the frame length T relative to the microphone 16*a*. $x_2(t)$ indicates an input signal that is extracted in the frame length T relative to the microphone 16*b*.

2) Peaks are extracted from the calculated cross-correlation. It is desirable that the number of the extracted peaks be equal to the number of sound sources when the number is known in advance. Positions of the extracted peaks on a time axis indicate an arrival time lag of the signals to the microphone 16*a* and the microphone 16*b*.

3) A difference (d in FIG. 7) between the distances from the sound source 14 to the microphone 16*a* and 16*b* is calculated based on the arrival time lag of the signals and the sound speed.

Figure 7:
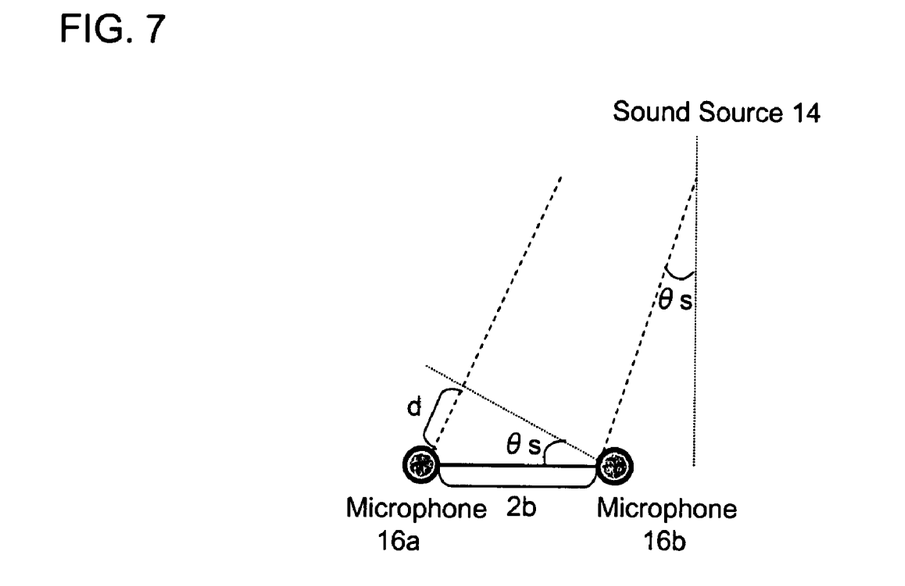
FIG. 7 is a graph showing a positional relation between microphones and a sound source.

4) As shown in FIG. 7, the inter-microphone distance $2b$ and the difference d in the distances from the sound source to the microphones are used to calculate the direction $\theta_s$ of the sound source 14 from Equation (13).

$$\theta_s=\arcsin(d/2b) \qquad (13)$$

When a plurality of peaks are extracted, each sound source direction $\theta_s$ for each peak is obtained.

2. 5. Trace of Sound Source Direction

Figure 8:
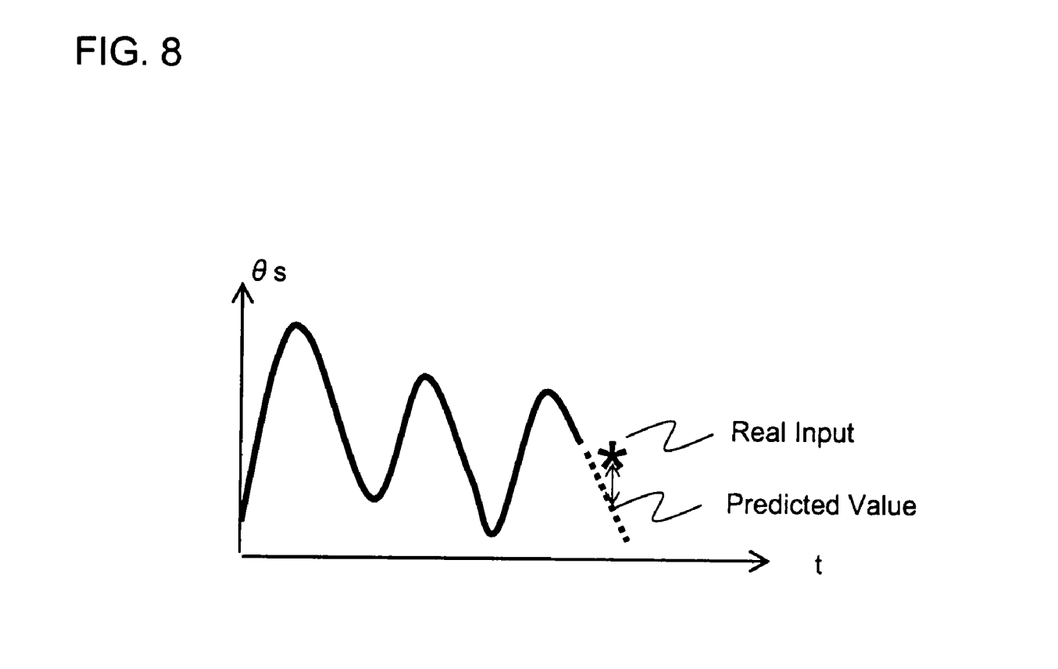
FIG. 8 is a graph showing a change in time in a sound source direction $\theta_s$.

When the sound source 14 and/or the body 12 move, the sound source direction is traced. FIG. 8 shows a change in time in the sound source direction $\theta_s$. The trace is performed as follows. The angle $\theta_s$ that is actually obtained is compared with the sound source direction $\theta_p$ that is predicted from the track of $\theta_s$ before that time point. When the difference is smaller than a predetermined threshold value, it is determined that the signals are from the same sound source. When the difference is larger than the threshold value, it is determined that the signals are from different sound sources. The prediction is performed by using a known prediction method for time series of signals such as the Kalman filter, an auto-regression prediction, the HMM or the like.

3. Sound Source Separation Unit

The sound source separation unit 23 uses the direction $\theta_s$ of the sound source 14 obtained in the sound source localization unit 21 to separate the sound source signals from the input signals. The separation in accordance with this embodiment is performed by combining the inter-microphone phase difference $\Delta\phi$ or the inter-microphone sound intensity difference $\Delta\rho$ obtained using the above-described epipolar geometry, scattering theory or transfer function with a pass-band function that imitates a human auditory feature. However, any other known method for separating the sound source signals using the sound source direction and separating the sound source for each sub-band such as a beam forming method and a GSS (Geometric Source Separation) method may be used in the sound source separation unit 23. When the sound source separation is performed in a time domain, the signals are transformed into a frequency domain after the separation process. The sound source separation in this embodiment is performed according to the following procedure:

1) The sound source direction $\theta_s$ and the phase difference $\Delta\phi(f_i)$ or the sound intensity difference $\Delta\rho(f_i)$ of the sub-band $f_i$ of the spectrum of the input signal are received from the sound source localization unit 21. When the technique for localizing the sound source in the frequency domain is not used in the sound source separation unit 23, $\Delta\phi(f_i)$ or $\Delta\rho(f_i)$ is obtained at this point using Equation (1) or Equation (3).

2) A pass-band function indicating a relation between a sound source direction and a pass-band is used to obtain a pass-band $\delta(\theta_s)$ corresponding to the sound source direction $\theta_s$ that is obtained in the sound source localization unit 21.

Figure 9:
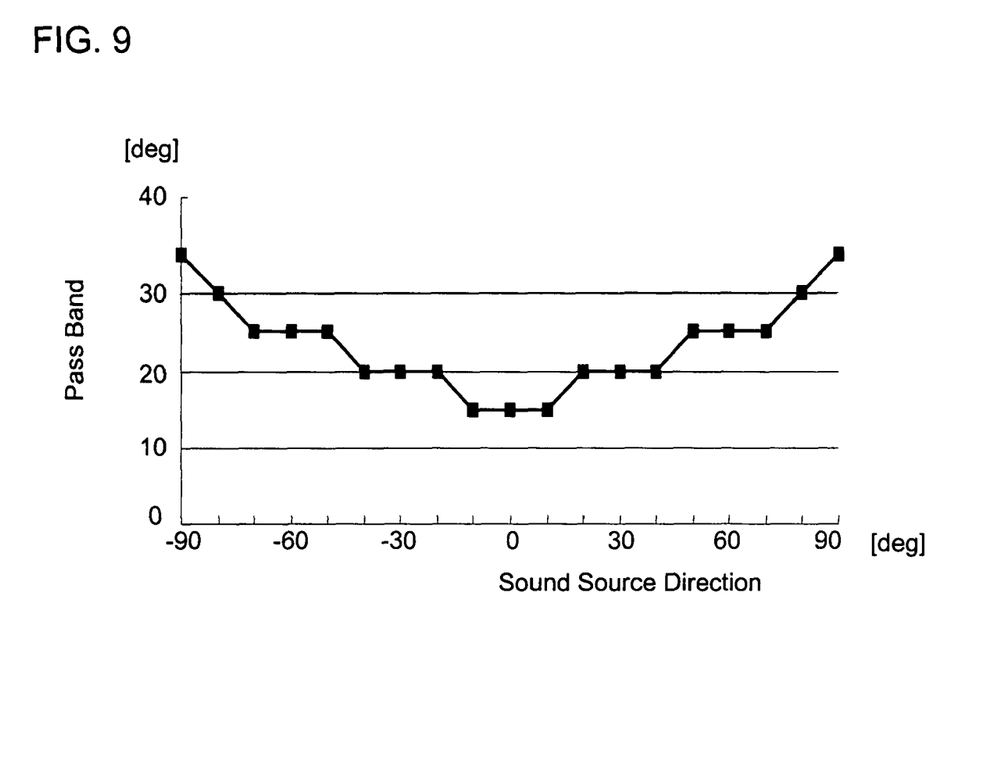
FIG. 9 is a graph showing a pass-band function $\delta(\theta)$.
Figure 10:
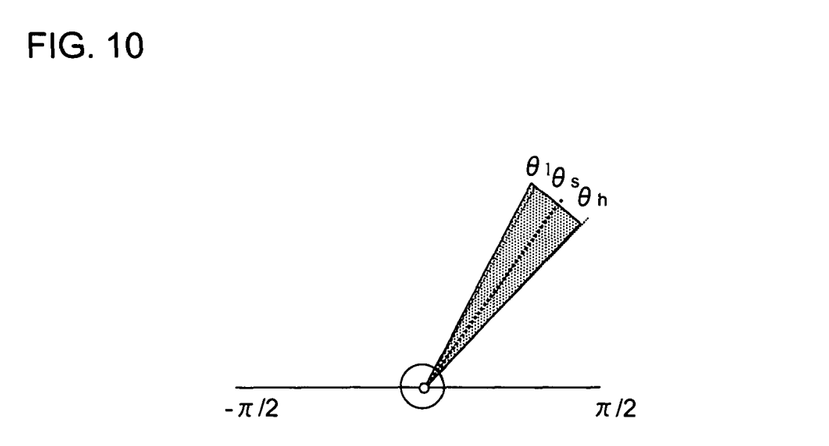
FIG. 10 is a graph showing a sound source direction $\theta_s$ and a pass-band.

The pass-band function is designed based on a human auditory characteristic that a resolution relative to the sound source direction is higher in the front direction but lower in the periphery. Therefore, for example, as shown in FIG. 9, the pass-band is set to be narrower in the front direction but wider in the periphery. The horizontal axis represents a level line in case when the front of the body 12 is assumed as 0 [deg].

3) From the obtained $\delta(\theta_s)$, a lower limit $\theta_l$ and an upper limit $\theta_h$ of the pass-band (as exemplarily illustrated in FIG. 8) are calculated by using Equation (14).

$$\theta_l = \theta_s + \delta(\theta_s)$$

$$\theta_h = \theta_s + \delta(\theta_s) \quad (14)$$

Figure 11:
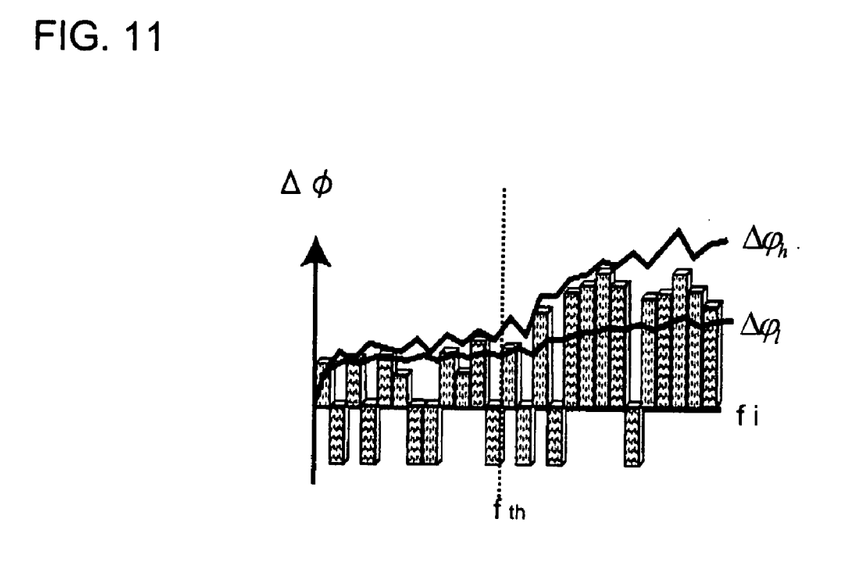
FIG. 11 is a graph showing how to select a sub-band by using a phase difference $\Delta\phi$ in a sound source separation unit.
Figure 12:
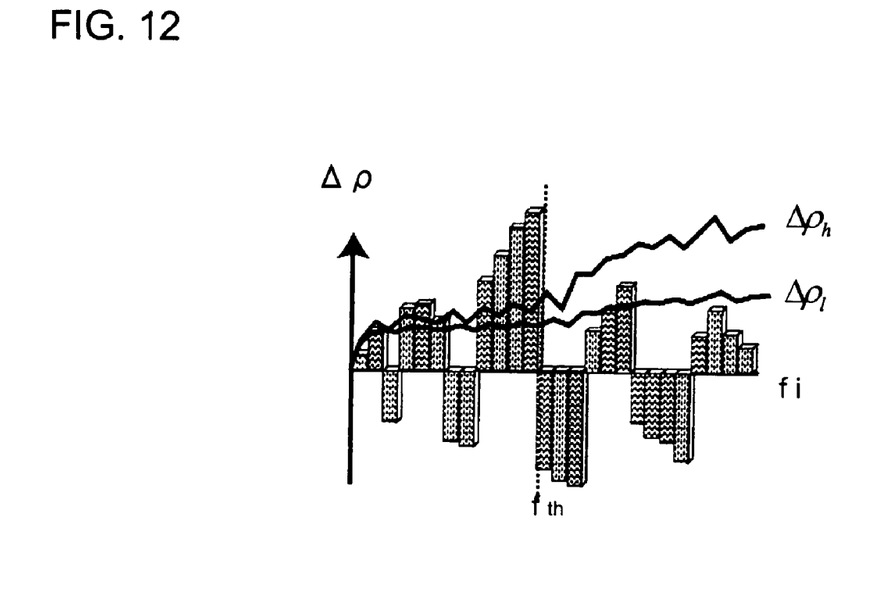
FIG. 12 is a graph showing how to select a sub-band by using a sound intensity difference $\Delta\rho$ in a sound source separation unit.

4) Phase differences $\Delta\phi_l$ and $\Delta\phi_h$ corresponding to $\theta_l$ and $\theta_h$ respectively are estimated using either of the above-described epipolar geometry (Equation (2) and FIG. 4), scattering theory (Equation (8)) and transfer function (FIG. 5). FIG. 11 is a graph showing an example of the relation between the estimated phase difference and the frequency $f_i$. Or, the sound intensity differences $\Delta\rho_l$ and $\Delta\rho_h$ corresponding to $\theta_l$ and $\theta_h$ are estimated using either of the above-described scattering theory (Equation (9)) and transfer function (FIG. 6). FIG. 12 is a graph showing an example of the relation between the estimated sound intensity difference and the frequency $f_i$.

5) It is checked whether $\Delta\phi(f_i)$ or $\Delta\rho(f_i)$ of each sub-band is located within the pass-band in order to select those which exist within the pass-band (FIG. 11 and FIG. 12). It is generally known that precision of separation is higher if phase difference is used for sound source localization with lower frequency. It is also known that precision of separation is higher if sound intensity difference is used for sound source localization with higher frequency. Accordingly, with the sub-band lower than a predetermined threshold value (for example, 1500 [Hz]), the phase difference $\Delta\phi$ may be selected, and with the sub-band higher than the threshold value, the sound intensity difference $\Delta\rho$ may be selected.

6) Flags of the selected sub-bands are set to 1 and flags of the unselected sub-bands are set to 0. The sub-bands having a flag of 1 are separated as the sound source signals.

Although the above-described sound source separation is performed with the spectra in a linear frequency domain, spectra in a mel frequency domain may be used alternatively. The mel frequency is a sensory measure of a human being for high/low of the sound. Its value almost corresponds to a logarithm of an actual frequency. In this case, the sound source separation in the mel frequency domain is performed after Step 1) in the above-described process by the sound source separation unit 23 according to the following procedure in which a filtering process for converting the signals into the mel frequency domain is added.

1) Spectra $S1(f)$, $S2(f)$ are obtained by performing a frequency analysis upon the signals that are input to the microphones 16a, 16b by using the FFT or the like.

2) A filter bank analysis is performed by triangle windows (for example, 24 pieces) spaced evenly in the mel frequency domain.

3) A phase difference $\Delta\phi(m_j)$ of each sub-band $m_j$ of the obtained mel frequency domain spectrum is obtained according to Equation (1) (where $f_i \rightarrow m_j$). Or, an inter-microphone sound intensity difference $\Delta\rho(m_j)$ is obtained according to Equation (3) (where $f_i \rightarrow m_j$).

4) The pass-band function (FIG. 9) representing a relation between the sound source direction and the pass-band is used to obtain a pass-band $\delta(\theta_s)$ corresponding to the sound source direction $\theta_s$ that is obtained in the sound source localization unit 21.

5) From the obtained $\delta(\theta_s)$, a lower limit $\theta_l$ and an upper limit $\theta_h$ of the pass-band are calculated by using Equation (14).

6) Phase differences $\Delta\phi_l$, $\Delta\phi_h$ corresponding to $\theta_l$, $\theta_h$ are estimated by using either of the above-described epipolar geometry (Equation (2) and FIG. 4), scattering theory (Equation (8)) and transfer function (FIG. 5). Or, sound intensity differences $\Delta\rho_l$, $\Delta\rho_h$ corresponding to $\theta_l$, $\theta_h$ are estimated by using either of the above-described scattering theory (Equation (9)) and transfer function (FIG. 6).

7) It is checked whether $\Delta\phi(m_j)$ or $\Delta\rho(m_j)$ of each mel frequency is located within the pass-band in order to select those which exist within the pass-band. It is generally known that precision of separation is higher if the phase difference is used for localization with low frequency, and is higher if the sound intensity difference is used for localization with high frequency. Accordingly, with the sub-band lower than a predetermined threshold value (for example, 1500 [Hz]), the phase difference $\Delta\phi$ may be selected, and with the sub-band higher than the threshold value, the sound intensity difference $\Delta\rho$ may be selected.

8) Flags of the selected mel frequencies are set to 1 and flags of the unselected mel frequencies are set to 0. The mel frequencies having a flag of 1 are regarded as the separated signals.

When the sound source separation is performed in the mel frequency domain, conversion into the mel frequency in a mask generation unit 25 (to be described later) is not required.

4. Mask Generation Unit

The mask generation unit 25 generates a value of a mask according to reliability of the result of the separation of the sound source separation unit 23. In this embodiment, either one of the schemes may be used, which include a mask generation scheme using the information from a plurality of sound source separation method (section 4.1), a mask generation scheme using the pass-band function (section 4.2) and a mask generation scheme considering influences by a plurality of sound sources (section 4.3). The mask generation unit 25 examines reliability of the flag (0 or 1) that is set in the sound source separation unit 23 to establish a value of the mask in consideration of the flag value and the reliability. The mask is assigned a value of 0 to 1. As the value is closer to 1, the reliability is higher.

4. 1. Mask Generation Using Information from a Plurality of Sound Source Separation Methods In this process, by using results of signal separation by a plurality of sound source separation methods, the mask generation unit 25 confirms reliability of the separation result of the sound source separation unit 23 so as to generate the mask. This process is performed according to the following procedure:

1) Sound source separation is performed using at least one sound source separation technique that is not used by the sound source separation unit 23 to establish a flag for each sub-band in the same manner as in the sound source separation unit 23. In this embodiment, the sound source separation by the sound source separation unit 23 is performed by using either of the following factors:

i) phase difference based on epipolar geometry
   ii) phase difference based on scattering theory
   iii) sound intensity difference based on scattering theory
   iv) phase difference based on transfer function
   v) sound intensity difference based on transfer function 2) The mask generation unit 25 examines whether the flags obtained in the sound source separation unit 23 correspond to the flags obtained in the above process 1) respectively in order to generate the mask. For example, assuming that (i) the phase difference based on the epipolar geometry is used in the technique of the sound source separation unit 23 and that (ii) the phase difference based on the scattering theory, (iii) the sound intensity difference based on the scattering theory and (v) the sound intensity difference based on the transfer function are used in the mask generation unit 25, the value of the mask in each situation is generated as follows:

TABLE 1

| Flag of (i) | Flags of (ii), (iii), (v) | Mask Value |
|---|---|---|
| 0 | all 0s | 0 |
| 0 | two 0s | 1/3 |
| 0 | one or no 0s | 1 |
| 1 | all 1s | 1 |
| 1 | two 1s | 1/3 |
| 1 | one or no 1s | 0 |

3) A filter bank analysis of a mel scale is performed on the obtained mask value so as to convert the mask value into a value of a mel frequency axis, so that a mask value can be generated. It should be noted that when the sound source separation is performed in the mel frequency domain as described above, this step is not needed.

Besides, the mask value that has been converted to the mel frequency axis may be converted to a binary mask value that has a value of 1 when the converted mask value exceeds a predetermined appropriate threshold value and a value of 0 when it does not exceed the threshold value.

4. 2. Mask Generation Using the Pass-Band Function

In this method, the mask value is generated based on closeness from the sound source direction by using the sound source direction $\theta_s$ and the pass-band function $\delta(\theta_s)$. Specifically, it is regarded that reliability of the flag having a value of 1 assigned by the sound source separation unit 23 is higher when the sound source direction is closer whereas reliability of the flag having a value of 0 assigned by the sound source separation unit 23 is higher when the sound source direction is further. This process is performed according to the following procedure:

1) The sound source direction $\theta_s$ and the input signal are received from the sound source localization unit 21.

2) The sound source direction $\theta_i$ of each sub-band is obtained from the input signal (when the sound source direction has been obtained in the sound source localization unit 21, that direction is used).

3) The pass-band $\delta(\theta_s)$ and the flag of each sub-band $f_i$ are received from the sound source separation unit 23 (which will be hereinafter represented by $\theta_t$).

Figure 13:
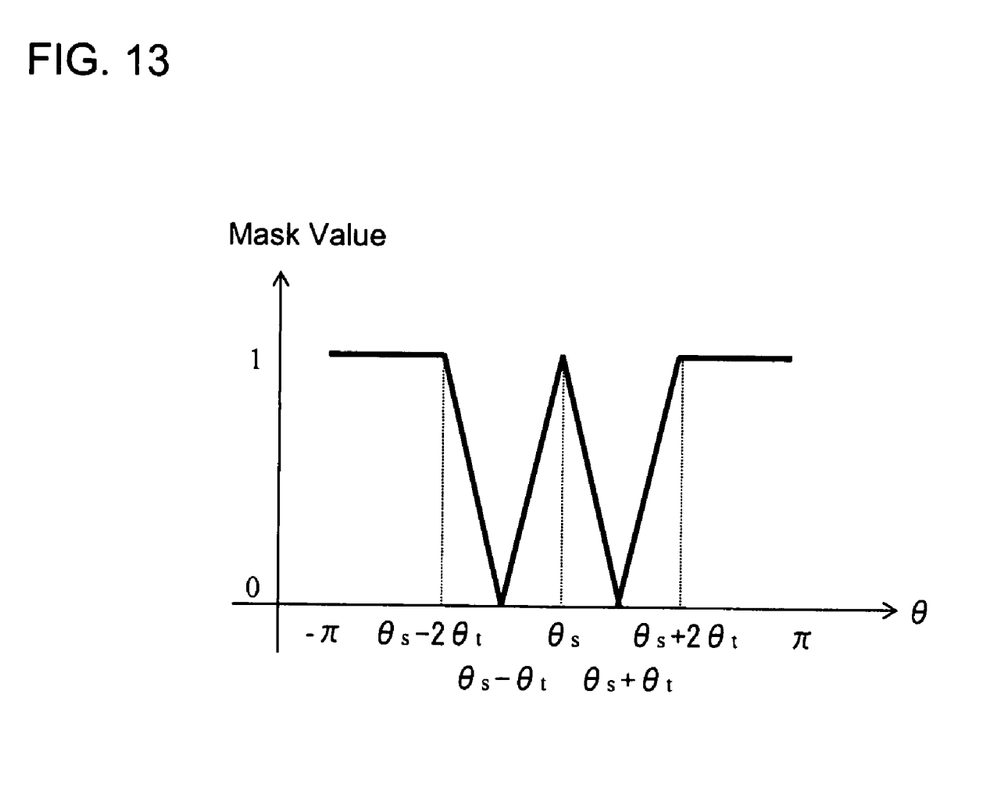
FIG. 13 is a graph showing a function of a mask using a pass-band function.

4) A function of mask is formed by using $\theta_t$ and a temporary mask is generated in comparison with $\theta_i$ of each sub-band. This function is given as in Equation (15) and its behavior is shown in FIG. 13.

$$\text{Temporary Mask} = \begin{cases} 1 & (-\pi \leq \theta_i < \theta_s - 2\theta_t) \\ -\frac{\theta_i - \theta_s}{\theta_t} - 1 & (\theta_s - 2\theta_t \leq \theta_i < \theta_s - \theta_t) \\ \frac{\theta_i - \theta_s}{\theta_t} + 1 & (\theta_s - \theta_t \leq \theta_i < \theta_s) \\ -\frac{\theta_i - \theta_s}{\theta_t} + 1 & (\theta_s \leq \theta_i < \theta_s + \theta_t) \\ \frac{\theta_i - \theta_s}{\theta_t} - 1 & (\theta_s + \theta_t \leq \theta_i < \theta_s + 2\theta_t) \\ 1 & (\theta_s + 2\theta_t \leq \theta_i < \pi) \end{cases} \quad (15)$$

5) The mask is generated as shown in Table 2 based on the flag obtained in the sound source separation unit 23 and the temporary mask obtained in the above step 4).

TABLE 2

| Flag | Temporary Mask | Mask Value |
|---|---|---|
| 0 | 1 | 0 |
| 0 | 1 > Temp Mask > 0 | Value of Temp Mask |
| 0 | 0 | 1 |
| 1 | 1 | 1 |
| 1 | 1 > Temp Mask > 0 | Value of Temp Mask |
| 1 | 0 | 0 |

6) A filter bank analysis of a mel scale is performed on the obtained mask value so as to convert the mask value into a value of a mel frequency axis, so that a mask value can be generated. It should be noted that when the sound source separation is performed in the mel frequency domain as described above, this step is not needed.

Besides, the mask value that has been converted to the mel frequency axis may be converted to a binary mask value that has a value of 1 when the converted mask value exceeds a predetermined appropriate threshold vale and a value of 0 when it does not exceed the threshold value.

4. 3. Mask Generation Considering Influences by a Plurality of Sound Sources

In a case of a plurality of sound sources, the mask is such generated to decrease the reliability of the sub-band when it is estimated that the signals from at least two sound sources are included in the concerned sub-band.

1) The sound source direction $\theta_{s1}$, $\theta_{s2}$, ... and the input signal are received from the sound source localization unit 21.

2) The sound source direction $\theta_i$ of each sub-band is obtained from the input signal. When the sound source direction has been obtained in the sound source localization unit 21, that direction is used.

3) The pass-bands $(\theta_{l1}, \theta_{h1})$, $(\theta_{l2}, \theta_{h2})$, ... of each sound source direction $\theta_{s1}$, $\theta_{s2}$, ... and the flags are received from the sound source separation unit 23.

4) It is examined:
  (i) whether the sound source direction $\theta_i$ of each sub-band is included in the pass-band $(\theta_l, \theta_h)$ of two or more sound sources; or
  (ii) whether the sound source direction $\theta_i$ of each sub-band is not included even in the pass-band of that sound source.

When either (i) or (ii) is true, a temporary mask having a value of 0 is generated as for the sub-band whereas a temporary mask having a value of 1 is generated as for the sub-bands in the other cases.

5) A mask is generated as shown in table 3 according to the flag and the temporary mask.

TABLE 3

| Flag | Temp Mask | Mask Value |
|---|---|---|
| 0 | 1 | 0 |
| 0 | 0 | 1 |
| 1 | 1 | 1 |
| 1 | 0 | 0 |

6) A filter bank analysis of a mel scale is performed on the obtained mask value so as to convert the mask value into a value of a mel frequency axis, so that a mask value can be generated. It should be noted that when the sound source separation is performed in the mel frequency domain as described above, this step is not needed.

Besides, the mask value that has been converted to the me frequency axis may be converted to a binary mask value that has a value of 1 when the converted mask value exceeds a predetermined appropriate threshold vale and a value of 0 when it does not exceed the threshold value.

5. Feature Extraction Unit

The feature extraction unit 27 determines features from the spectrum of the input signal using a known technique. This process is performed according to the following procedure:

1) The spectrum is obtained by using the FFT or the like.

2) A filter bank analysis is performed through triangle windows (for example, 24 pieces) spaced evenly in the mel frequency domain.

3) A logarithm of the analysis result is calculated to obtain a mel frequency logarithm spectrum.

4) A discrete cosine conversion is performed to the logarithm spectrum.

5) The terms of zero-order and higher orders (for example, 13th to 23rd) of cepstrum coefficients are set to zero.

6) Cepstrum mean suppression (CMS) is performed.

7) An inverse discrete cosine transform is performed.

The obtained features are represented by feature vector $x=(x_1, x_2, \ldots, x_j, \ldots, x_J)$.

6. Speech Recognition Unit

In this embodiment, the speech recognition unit 29 performs a speech recognition by using the HMM that is known as a conventional technique.

When the vector of feature is x and the state is S, an output probability f(x, S) of the usual continuous distribution type of HMM is represented by Equation (16).

$$f(x|S) = \sum_{k=1}^{N} P(k|S) f(x|k, S) \quad (16)$$

where N represents the number of mixtures of normal distribution and P(k|S) represents a mixture ratio.

The speech recognition based on the missing feature theory uses a calculation result of averaging f(x, S) by a probability density function p(x) of x.

$$\overline{f(x|S)} = \sum_{k=1}^{N} P(k|S) f(x_r|k, S) \quad (17)$$

In Equation (17), $x=(x_r, x_u)$ is assumed where $x_r$ represents reliable components of the vector of feature (the value of their mask is larger than 0) and $x_u$ represents unreliable components of the vector of feature (the value of their mask is 0).

Assuming that the unreliable components of the feature are distributed evenly in a range of $[0, x_u]$, Equation (17) can be re-written as in Equation (18).

$$\overline{f(x|S)} = \sum_{k=1}^{N} P(k|S) f(x_r|k, S) \frac{1}{x_u} \int_0^{x_u} f(x'_r|k, S) dx'_u \quad (18)$$

An output probability o(xj|S) of the j-th component of x can be expressed as in Equation (19).

$$o(x_j|S) = \begin{cases} M(j)f(x_j|S) + (1-M(j))\overline{f(x_j|S)} & if M(j) \neq 0 \\ 1 & otherwise \end{cases} \quad (19)$$

where M(j) represents the mask of the j-th component in the vector of feature.

An overall output probability o(x|S) can be expressed as in Equation (20).

$$o(x|S) = \sum_{k=1}^{N} P(k|S) \exp\left\{\sum_{j=1}^{J} M(i) \log f(x_i|k, S)\right\} \quad (20)$$

where J represents a dimension of the vector of feature.

Equation (20) can be also expressed as in Equation (21).

$$o(x|S) = \sum_{k=1}^{N} P(k|S) \exp\left\{\sum_{j=1}^{J} M(i) \log f(x_i|k, S)\right\} \quad (21)$$

The speech recognition is performed by using either Equation (20) or Equation (21).

Although the present invention has been described above with reference to the specific embodiments, the present invention is not limited to such specific embodiments.

The invention claimed is:

1. A speech recognition apparatus for recognizing speech from sound received from outside, the apparatus comprising:
    at least two sound detectors for detecting sound;
    means for localizing a sound source based on the sound and for determining a direction of the sound source;
    a first means for separating a speech from the sound based on the determined direction of the sound source and generating a result of the separation, wherein the result comprises a value indicative of a reliability of the result, said first means for separating a speech comprising means for identifying frequency sub-bands of the speech whose phase difference and/or sound intensity difference is within a pass-band, wherein the pass-band is based on a resolution relative to a sound source direction being higher in a front direction but lower in a periphery;
    means for generating a mask according to the reliability of the result;
    means for extracting features of the sound; and
    means for recognizing speech from the sound by applying the mask to the extracted features,
    wherein said means for generating a mask comprises:
        a second means for separating a speech according to the sound source from the sound based on the determined direction of the sound source using different source separating scheme than the one used in said first means and generating another result of the separation;
        means for comparing the result from said first means with the another result from said second means and outputting a comparing result indicative thereof; and
        means for assigning masking values to sub-bands of the speech based on the comparison result.

2. The speech recognition apparatus as claimed in claim 1, wherein said means for generating a mask generates the value of the mask according to a pass-band indicative of a sound source direction and used to determine whether or not the sound is from the same sound source.

3. The speech recognition apparatus as claimed in claim 1, further comprising:
multiple sound sources, wherein said means for generating a mask assigns a high value to a sub-band of the sound of a sound source of the multiple sound sources that is closest to the speech recognition apparatus.

4. The speech recognition apparatus as claimed in claim 1, wherein when the value is closer to 1, the reliability is higher and when the value is closer to 0, the reliability is lower.

5. A method for recognizing sound received by at least two sound detectors, comprising:
localizing a sound source based on the sound, and determining a direction of the sound source;
a first step of separating a speech from the sound based on the determined direction of the sound source and generating a result of the separation, wherein the result comprises a value indicative of a reliability of the result;
generating a mask according to the reliability of the result;
extracting features of the sound; and
recognizing speech from the sound by applying the mask to the extracted features.

6. The method as claimed in claim 5, wherein said generating a mask comprises:
a second step of separating a speech according to the sound source from the sound based on the determined direction of the sound source using different source separating scheme than the one used in said first step and generating another result of the separation;
comparing the result from said first step with the another result from said second step and outputting a comparing result indicative thereof; and
assigning masking values to sub-bands of the speech based on the comparison result.

7. The method as claimed in claim 6, wherein said first step of separating a speech comprises:
identifying frequency sub-bands of the speech whose phase difference and/or sound intensity difference is within a pass-band, wherein the pass-band is based on a resolution relative to a sound source direction being higher in a front direction but lower in a periphery.

8. The method as claimed in claim 5, wherein when the value is closer to 1, the reliability is higher and when the value is closer to 0, the reliability is lower.

9. A speech recognition apparatus to recognize speech from sound received from outside, the apparatus comprising:
at least two sound detectors configured to detect sound;
a localizing unit configured to localize a sound source based on the sound, and configured to determine a direction of the sound source;
a first separation unit configured to separate a speech from the sound based on the determined direction of the sound source and generate a result of the separation, wherein the result comprises a value indicative of a reliability of the result, and wherein the first separation unit comprises:
an identifying unit configured to identify frequency sub-bands of the speech whose phase difference and/or sound intensity difference is within a pass-band, wherein the pass-band is based on a resolution relative to a sound source direction being higher in a front direction but lower in a periphery;
a generation unit configured to generate a mask according to the reliability of the result;
an extracting unit configured to extract features of the sound; and
a speech recognition unit configured to recognize speech from the sound by applying the mask to the extracted features, wherein the generation unit comprises
a second separation unit configured to separate a speech according to the sound source from the sound based on the determined direction of the sound source using a different source separating scheme than the one used in the first separation unit, and configured to generate another result of the separation;
a comparing unit configured to compare the result from said first separation unit with the another result from said second separation unit and outputting a comparing result indicative thereof; and
an assigning unit configured to assign masking values to sub-bands of the speech based on the comparison result.

10. The speech recognition apparatus as claimed in claim 9, wherein the generation unit generates the value of the mask according to a pass-band indicative of a sound source direction and used to determine whether or not the sound is from the same sound source.

11. The speech recognition apparatus as claimed in claim 9, further comprising:
multiple sound sources, wherein the generation unit assigns a high value to a sub-band of the sound of a sound source of the multiple sound sources that is closest to the speech recognition apparatus.

12. The speech recognition apparatus as claimed in claim 9, wherein when the value is closer to 1, the reliability is higher and when the value is closer to 0, the reliability is lower.

\* \* \* \* \*